United States Patent
Heren (10) Patent No.: US 9,464,641 B2
(45) Date of Patent: Oct. 11, 2016

(54) HYDRAULIC TRANSMISSION DEVICE ALLOWING ENERGY RECOVERY

(75) Inventor: Jean Heren, Margny les Compiegne (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 743 days.

(21) Appl. No.: 13/362,383

(22) Filed: Jan. 31, 2012

(65) Prior Publication Data

US 2012/0240567 A1   Sep. 27, 2012

(30) Foreign Application Priority Data

Jan. 31, 2011   (FR) ...................... 11 50703

(51) Int. Cl.
| | | |
|---|---|---|
| F16H 39/00 | (2006.01) |
| F15B 1/02 | (2006.01) |
| F15B 1/027 | (2006.01) |
| F15B 21/14 | (2006.01) |
| F16H 61/4096 | (2010.01) |
| B60K 6/12 | (2006.01) |
| F16H 61/4148 | (2010.01) |

(52) U.S. Cl.
CPC ............. F15B 1/024 (2013.01); B60K 6/12 (2013.01); F15B 1/027 (2013.01); F15B 21/14 (2013.01); F16H 61/4096 (2013.01); F16H 61/4148 (2013.01); *Y02T 10/6208* (2013.01)

(58) Field of Classification Search
CPC .............................................. F15B 2211/7121
USPC ...................... 60/413, 414; 91/520
See application file for complete search history.

(56) References Cited

U.S. PATENT DOCUMENTS

| | | | | |
|---|---|---|---|---|
| 4,759,659 A | * | 7/1988 | Copie | ............................ 404/117 |
| 5,520,443 A | * | 5/1996 | Zanzig | ........................ 298/23 M |
| 6,167,701 B1 | * | 1/2001 | Hatcher et al. | .................. 60/416 |
| 6,755,113 B2 | * | 6/2004 | Shih | .................................... 91/5 |
| 7,409,826 B2 | * | 8/2008 | Epshteyn | ........................ 60/414 |
| 2008/0093152 A1 | * | 4/2008 | Gray | ............................ 180/307 |

FOREIGN PATENT DOCUMENTS

| | | |
|---|---|---|
| EP | 1 433 648 A2 | 6/2004 |
| FR | 2903156 A1 | 1/2008 |
| FR | 2941976 A1 * | 8/2010 .............. F15B 1/024 |
| WO | 2008/012558 A2 | 1/2008 |

OTHER PUBLICATIONS

European Search Report: FA 749493 FR 1150703.

* cited by examiner

*Primary Examiner* — Michael Leslie
*Assistant Examiner* — Matthew Wiblin
(74) *Attorney, Agent, or Firm* — Ladas & Parry LLP (57) ABSTRACT

An hydraulic transmission device (10,110) comprising an hydraulic motor (16, 18), an hydraulic pump (20), a fluid accumulator (22). The device has an accumulator-driven mode, an energy-recovery mode, a pump-driven mode. In the pump-driven mode, the pump supplies the motor with fluid drawn from an unpressurized reservoir; and in the energy-recovery mode, the motor is supplied by the pump drawing fluid from said reservoir. An assembly (1) comprising a device (10,110) as defined above, a shaft (11, 13), and a mass (12, 14) mounted eccentrically on the shaft.

18 Claims, 3 Drawing Sheets

HYDRAULIC TRANSMISSION DEVICE ALLOWING ENERGY RECOVERY

The invention relates to a hydraulic transmission device capable of driving in rotation, and braking, one or more rotating elements; these elements being required to be driven in rotation, then braked, numerous times.

The invention contemplates in particular a device used to rotate eccentric masses, so called because they are eccentrically mounted on the shafts of the rolls of a road compactor. When they are set in rotation about these shafts, these eccentric masses cause a vibration of the rolls of the compactor; this vibration makes it possible to compact the roadway under construction. The rotation speeds required are considerable, and customarily vary between 2000 and 4,200 revolutions per minute.

The quality of the compaction requires a given number of impacts (corresponding to the rotations performed by the eccentric masses) per meter as the compactor advances. Hence, depending on the variations of the speed of the compactor, and particularly its stops, it must be capable of causing very rapid variation in the rotation speed of the masses, and particularly of stopping them very quickly.

Thus in a road compactor, the eccentric masses must be able to be driven into rotation at high speed in a very brief time, during acceleration periods, to cause the rolls on which they are mounted to vibrate. Thereafter, during stop periods, it must also be possible to stop them in a very short time.

More generally, the invention is applicable to any hydrostatic device that must provide a drive that is alternating, or at least chopped, that is having numerous drive periods separated by stops. The invention is particularly aimed at devices which must be driven in two different directions, such as a sawbench, the turret of a power shovel, hydraulic drive of a machine performing to-and-fro motion, open circuit operation, etc.

In road compactors, the known method for driving vibrating masses is provided by a device including several hydraulic motors fed by a pump. During acceleration periods, the vibrating masses are driven by the motor(s). During a stop period, the fluid is made to circulate through the motor(s), which then operate as pumps; the fluid pumped in this manner is forced to circulate through restrictions which cause head loss, thus dissipating energy in the form of heat. The fluid is cooled by a heat exchanger to avoid excessive heating. The device also includes a booster pump, to supply the circuit with fluid from a non-pressurized reservoir, and to maintain a minimum pressure in certain parts of the device, and thus avoid any risk of cavitation.

The disadvantage of such a device is that it consumes a large quantity of energy, dissipated in the form of heat at each stop period, and also necessitates a relatively large pump so as to ensure the rapidity of acceleration during acceleration periods.

Further, to drive rotating elements by hydraulic means, with a satisfactory energy efficiency, one known solution consists of a device including one or more hydraulic motors fed by a pump, the pump being connected to the motors by a closed circuit. The closed circuit is supplied with fluid by a booster pump. To save energy, the device also includes a pressurized-fluid accumulator, located on a branch line from the high-pressure portion of the closed circuit, wherein the kinetic energy of the rotating elements can be stored, then returned.

Such a device is disclosed for example by document EP1433648, or else document WO2008/012558. Advantageously, it makes it possible to recover the energy of rotation of the driven rotating elements, through the motors operating as pumps. The recovered energy is stored in the form of fluid under pressure in the accumulator.

Such a device, however, is relatively complex, which makes it particularly costly.

Hence the objective of the invention is to propose a hydraulic transmission mechanism comprising at least one hydraulic motor, a hydraulic pump, a fluid accumulator capable of storing and delivering fluid under pressure; the device being capable of being operated:

in an accumulator-driven mode, wherein the fluid under pressure delivered by the accumulator is used to drive the motor in rotation;

in an energy-recovery mode, wherein the motor acting as a pump delivers fluid back into the accumulator; and in a pump-driven mode, wherein said motor is driven by fluid delivered by the pump;

an hydraulic transmission device which is able to drive in rotation or to brake, quickly, one or more rotating elements; which has a simple structure and a relatively high energy efficiency.

This objective is attained thanks to the fact that in the device, in the pump-driven mode, the pump supplies the motor with fluid drawn from an unpressurized reservoir; and in the energy-recovery mode, the motor is fed by the pump drawing fluid from the reservoir.

Thanks to the two drive modes previously presented, the device allows one or more rotating elements to be driven.

Furthermore, advantageously, the device may include only a single pump and a single accumulator. It therefore exhibits a relatively simple structure.

Finally, the possibility of recovering energy gives it a relatively high energy efficiency by allowing the recovery of energy released during braking.

The device according to the invention can be made just as well with a single hydraulic motor as with a plurality of hydraulic motors.

However, for the sake of simplicity, in what follows the invention is mainly presented as if the device had a single motor, coupled to a rotating element. It must however be noted that the presentation that follows is equally applicable in its entirety to a device according to the invention having several motors. Any reference to one motor therefore also encompasses a reference to a plurality of motors, or even a reference to "at least one motor."

When the device according to the invention includes several motors, these can be associated in different ways. In one embodiment for example, these motors are fed through a single feed port and their exhausts (meaning here the fluid streams leaving the motors) are directed to a single exhaust port. The motors can in particular be arranged in series along a series line.

Further, in the device according to the invention, the hydraulic motor can in particular be an hydraulic motor having two main ports, and wherein the direction of circulation of the fluid in these ports determines the direction of rotation of the motor's output component.

The invention can however also be implemented with a motor also having two main ports, but wherein the direction of rotation of the motor's output component can be determined independently of the direction of circulation of the fluid in its main orifices.

In one embodiment, the device includes pressure-limiting equipment which:

in pump-driven mode, limits the pressure delivered by the pump to a first threshold; and in energy-recovery mode, limits the pressure of fluid delivered by the pump to a second threshold lower than the first threshold.

In this pressure-limiting equipment, the arrangements allowing the pressure of the fluid delivered by the pump in pump-driven mode below the first threshold are generally arranged between the pump delivery port and the feed port of the motor. They can consist in particular of a pressure limiter interposed between the delivery port of the pump and the unpressurized reservoir. This limiter is calibrated to said first threshold, which is set at a relatively high pressure, but still sufficiently low to protect the pump and the motor(s).

Moreover, for the rotating element coupled to the motor to be effectively braked, the pressure-limiting equipment constrains the feed pressure of the motor to remain below the second threshold, which is set to a value lower than the first threshold.

The second threshold is selected lower than a usual feed pressure of the motor when operating as a motor. The second threshold can for example be equal to 50 Bars, or even to 10 Bars.

The pressure-limiting equipment can be implemented in various ways.

The feed pressure of the motor can be limited by a pressure limiter interposed between the motor's feed line and the unpressurized reservoir.

In a first embodiment, the pressure-limiting equipment comprises two pressure limiters, the setting values whereof correspond respectively to the first and second thresholds. It will be understood that the device is so arranged that the pressure of the circuit whereby the pump supplies fluid to the motor is limited by one or the other of these limiters, depending on whether the device is in pump-driven mode or in energy-recovery mode.

In a second embodiment, adjustment arrangements are integrated into the pressure limiter, which is then a pressure limiter with an adjustable setting. The pressure-limiting equipment then includes a variable setting pressure limiter, said first and second thresholds corresponding to the different settings of said limiter.

In addition, the device can be arranged so as to make it possible to modulate the braking torque applied to the rotating element in energy-recovery mode. To this end, the device must include means for adjusting the pressure of the fluid supplied to the motor in this mode of operation. Indeed, by varying this pressure threshold, the braking torque transmitted by the motor is altered, and consequently the intensity of braking is made to vary.

To this end, the pressure-limiting equipment must therefore include arrangements for varying the value of the second threshold. For example, a pressure limiter the pressure setting whereof defines the second threshold can be of the controllable type. The pressure setting of this limiter is then adjusted by the operator who operates the machine on which the device is mounted.

Advantageously, the same pressure limiter can possibly be used to also limit the pressure of the fluid delivered by the pump to the first threshold mentioned previously.

A second objective of the invention is to propose an assembly comprising an hydraulic transmission device, comprising an hydraulic motor, an hydraulic pump, a fluid accumulator capable of storing and delivering fluid under pressure; the device being capable of being operated in the accumulator-driven, energy-recovery and pump-driven modes presented previously;

an assembly also comprising a shaft and a mass mounted eccentrically on the shaft, capable of being driven in rotation about the shaft so as to make it vibrate, said at least one motor being coupled to said mass;

an assembly the hydraulic transmission device whereof is able to drive in rotation or rapidly brake the mass, and further having a simple structure and exhibiting a relatively high energy efficiency.

This objective is attained thanks to the fact that the device is of the type previously presented.

In the energy-recovery mode, which is a braking period for the rotating element driven by the motor, the fluid delivered by the motor (fed by the pump) is directed to the accumulator. The pump provides a pressure boost to the motor so as to prevent any cavitation.

During this braking period, the motor operates as a pump; the pumped fluid allows the accumulator to be filled, at least partially. This energy-recovery mode allows effective braking of the rotating element driven by the motor (this can be several rotating elements, driven by the motor or by different motors), due to the increase in pressure occurring in the accumulator.

Two drive modes provide drive to the motor. Generally, in these drive modes, the fluid leaving the motor is directed to the unpressurized reservoir, possibly through a calibrated valve; the device according to the invention thus operates with an open circuit.

In pump-driven mode, the pump operating with an open circuit provides drive to the motor. In general, in pump-driven modes, the fluid is not pumped back into the accumulator but is redirected to the reservoir.

In accumulator-driven mode, also called energy restitution mode, the pressure of the fluid delivered by the accumulator drives the motor.

The accumulator-driven mode serves to bring the rotating element coupled to the motor into rotation, particularly starting from a situation where it is stopped. For driving the rotating element in this operating mode of the device according to the invention, the motor is fed by the accumulator. Advantageously, the instantaneous delivery of the accumulator can be very high, particularly by comparison with an hydraulic pump: thus, the time needed to drive the rotating element into rotation is less than if it were driven by a pump.

To drive the rotating element, at the beginning the fluid contained in the accumulator is preferably used first; the pump is started later, to continue driving the motor when the accumulator is empty. It is possible, however, to choose to have the device able to be operated in a specific pump-driven mode called "pump- and accumulator-driven mode," wherein the accumulator feeds said at least one motor as a supplement to the feed provided by the pump.

When the device is in the pump- and accumulator-driven mode, generally a delivery port of the pump and a port of the accumulator are connected to a feed port of the motor; and an exhaust port of the motor is connected to an unpressurized reservoir. In this case, the motor is simultaneously connected to the accumulator and to the pump so that it is supplied with fluid by the source, whether the accumulator or the pump, the pressure whereof is higher.

This operating mode, using the fluid coming from the accumulator, is only temporary. In steady-state operation, the device normally operates in a pump-driven mode, called pump-only drive mode, wherein the motor is fed only by the pump and does not receive fluid from the accumulator.

To this end, the device is preferably arranged so that, in pump-driven mode:

a delivery port of the pump is connected to a feed port of said at least one motor; and further an exhaust port of said at least one motor is connected to an unpressurized reservoir. Thus in this drive mode, the circuits traveled respectively by the feed and exhaust fluid of the motor are distinct.

Regardless of the source of the feed fluid of the motor, to minimize energy consumption caused by the driving of the rotating element it is preferable to resort whenever possible to the accumulator-driven mode. To this end, the device can also include a control unit arranged so as to, when said at least one motor must be driven in rotation, if the pressure in the accumulator is greater than a predetermined threshold, place the device in accumulator-driven mode. Thus it is the energy stored in the accumulator that is used from that moment on, with priority over all others (or at most simultaneously), to drive the motor. The control unit can be electronic or electromechanical.

The different operating modes previously indicated can be implemented in particular thanks to an adequate arrangement of piping and valves connecting particularly the pump, the motors and the accumulator.

The device can include in particular an accumulator charging valve, consisting of a first upstream port connected to an exhaust port of said motor and a first downstream port connected to the accumulator, and having a first and a second positions, wherein they allow respectively the connection of the exhaust port of the motor to the accumulator, and the isolation of the exhaust port of the motor from the accumulator. The connection between the first downstream port and the accumulator can in particular have a non-return valve allowing passage of fluid only toward the accumulator.

In the foregoing definition and the following ones, the terms "upstream port" and "downstream port" refer only to one possible direction of fluid in the valve, which is generally but not necessarily the preferred direction.

In addition the expressions "connected to an exhaust port" or "connected to the accumulator" indicate that a fluidic relation or connection is established in the appropriate operating mode of the device, but not necessarily permanently. This same convention is continued in the following.

The first position of the charging valve makes it possible for the fluid leaving the motor to be directed to the accumulator, and thus to charge the accumulator in energy-recovery mode.

The charging valve can in particular be a four-way valve, having in addition a second upstream port connected to a feed port of the motor, and a second downstream port that the device allows to connect to a delivery port of the pump or to an unpressurized reservoir; in the first position of the charging valve, the first upstream port is connected to the first downstream port and the second upstream port is connected to the second downstream port; and in the second position of the charging valve, the first upstream port is connected to the second downstream port and the second upstream port is connected to the first downstream port. Thanks to this arrangement, the charging valve is able to direct the exhaust fluid from the motor either to the accumulator (for the energy-recovery mode) or to the reservoir (when the accumulator is full); it can also allow the fluid delivered by the pump to be directed to the motor feed while redirecting the fluid leaving the motor to the accumulator. This last possibility is made use of when the device is in the energy-recovery mode.

The accumulator-driven mode can be implemented particularly by using a dedicated valve: The device can thus include an accumulator discharge valve, made with an upstream port which the device allows to be connected to the accumulator and a downstream port which the device allows to be connected to a feed port of the motor, and having a first and a second positions, wherein it makes it possible to respectively isolate or connect its two ports. For safety, a non-return valve can be provided between the discharge valve and the motor feed pipe, the valve allowing fluid to flow only toward the motor. Such a valve is intended to prevent any flow of fluid from the pump to the accumulator, in the event that the pump would be in parallel with the accumulator connected to the motor's feed port to supply it with fluid.

When the accumulator is or becomes empty, the driving of the motor must generally be provided for by the pump. To this end, it is generally preferable that the device be operated in a pump-driven mode, a mode wherein the fluid feeding the motor is delivered only by the pump, or possibly simultaneously by the pump and by the accumulator.

Operation of the device, particularly with the energy-recovery mode and the pump-driven mode (whether supplementing the accumulator or not), can be carried out in particular by providing in the device a four-way pump valve, having:

a first upstream port connected to a delivery port of the pump;

a second upstream port connected to an unpressurized reservoir;

a first downstream port which the device allows to be connected to a feed port of the motor;

a second downstream port that the device allows to be connected to an exhaust port of the motor;

a first position wherein the first upstream port is connected to the first downstream port, and the second upstream port is connected to the second downstream port;

a second position, wherein the first upstream port is connected to the second downstream port, and the first and the second downstream ports are isolated.

In one embodiment, the first position can be a feed position, usable in accumulator-driven mode and/or in pump-driven mode, and the second position can be an isolation position, usable for isolating the pump from the motor.

In one embodiment, the pump valve can be arranged so as to also have a third position, wherein the first upstream port is connected to the second downstream port, and the second upstream port is connected to the first downstream port.

This third position can be used in particular to direct the fluid leaving the pump to a pipe wherein the pressure is limited by a pressure limiter connected to an unpressurized reservoir, and particularly the pipe connecting the second downstream port of the charging valve to the unpressurized reservoir.

In the latter case, the second downstream port of the pump valve is connected to the second downstream port of the charging valve; the device can then preferably also include a control unit arranged so as to, in energy-recovery mode, place the pump valve in the third position, and the discharge valve in the first position.

As indicated previously, the device according to the invention can include several motors. These can be involved in different ways.

In one embodiment, the device includes at least two motors, as well as circuit arrangements able to cause the fluid to pass or not through said at least two motors such that, in one configuration of the device, in accumulator-driven mode, the fluid under pressure drives at least a second motor in rotation in addition to the first motor; and in energy-recovery mode, the first and the second motors are fed and the fluid leaving the first and the second motor is injected into the accumulator.

The circuit arrangements can include in particular circuits, valves and possibly a control unit.

The circuit means can for example include valves allowing the interposition of the first and/or the second motor on one series line independently of one another. Thus, the device can be placed in different configurations, depending on whether the first motor, or the second motor, or both motors are interposed on the series line. When a single motor is interposed on the series line, it can be considered to be "the motor" previously mentioned. When two or more motors (called here "the interposed motors") are interposed on the series line, the device operates in the following manner:

in accumulator-driven mode (c), the fluid under pressure which flows through said series line drive all the interposed motors in rotation; and in energy-recovery mode, the fluid under pressure which flows through said series line passes through all the interposed motors to then be injected into the accumulator, the different interposed motors then operating as pumps.

The invention will be well understood and its advantage will appear more clearly upon reading the detailed description that follows of embodiments shown by way of non-limiting examples.

Figure 1:
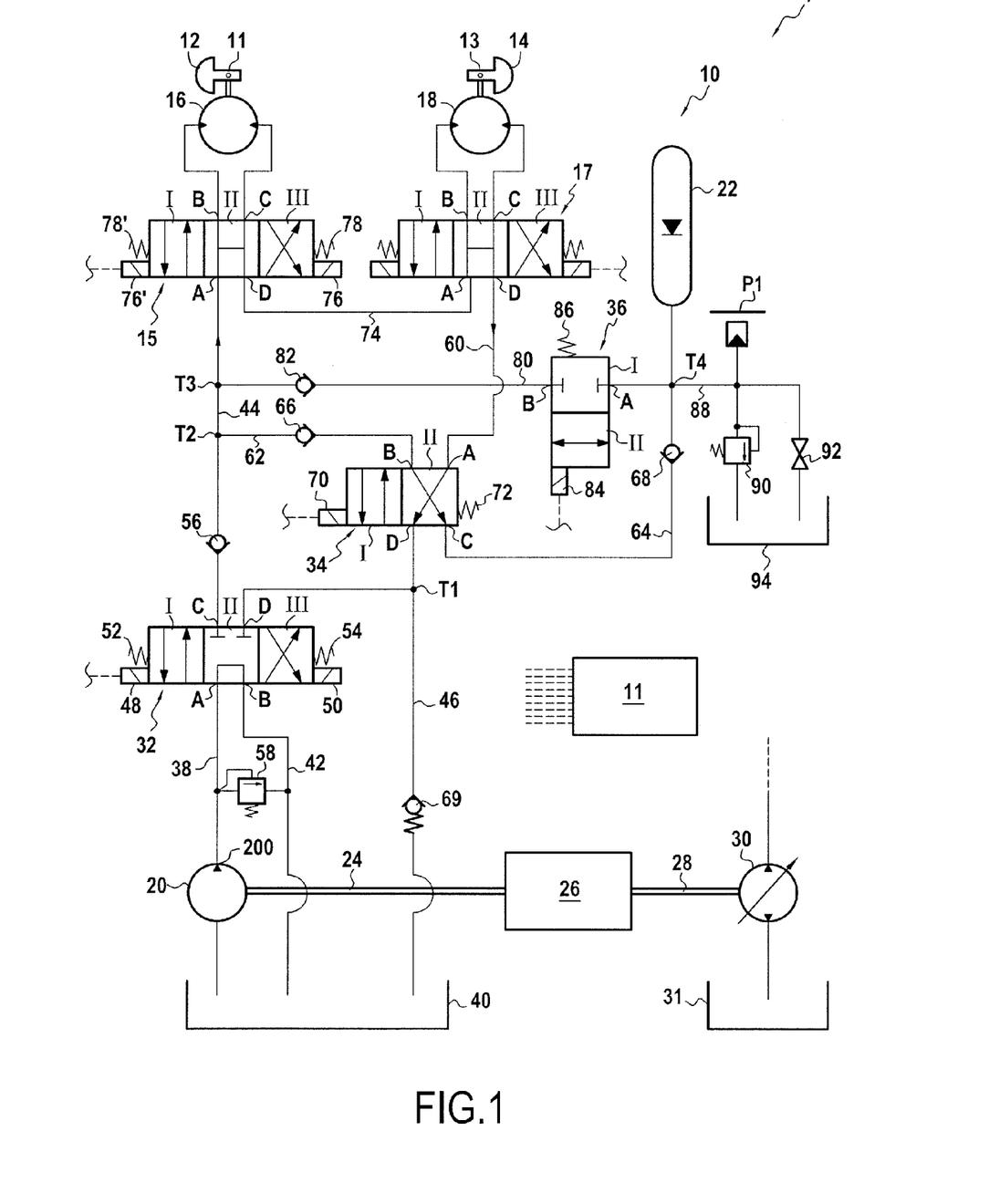
FIG. 1 is a first embodiment of the invention.

An hydraulic transmission device 10 according to the invention in a first embodiment will now be described in relation to FIG. 1.

The device 10 is a device used to drive two eccentric masses 12 and 14. These eccentric masses or "vibrating masses" are attached to the inside of two rolls arranged respectively at the front and at the rear of a road compactor, not shown. They are attached eccentrically respectively at the front and at the rear of a road compactor, not shown. They are attached eccentrically respectively to the shafts 11 and 13 of the two rolls, in order to be able to cause the rolls to vibrate when they are set in rotation around the shafts 11 and 13.

The device 10, associated with the shafts 11 and 13 and with the masses 11 and 13, constitutes an assembly 1 according to the invention.

The device 10 comprises:
two radial-piston hydraulic motors 16 and 18;
one hydraulic pump 20;
1. a fluid accumulator 22, able to store and deliver fluid under pressure; and
    a control unit 11, which actuates the different valves of the device 10.

So as not to overload the figures, the information transmission connections of the different valves of the circuit and of the pressure sensor P1 (which will be presented further on) to the control unit 11 are not shown in the figures.

The pump 20 is driven by a first output shaft 24 of the heat engine 26 (a diesel engine) of the compactor. The pump 20 is permanently driven by the shaft 24 when it is operating.

The engine 26 also drives, through a second output shaft 28, a variable displacement pump 30. This pump 30 is used for driving the rolls, while the pump 20 is used to drive the masses 12 and 14 contained in the rolls. The pump 30 pumps fluid from an unpressurized reservoir 31.

The device 10 also comprises:
a pump valve 32,
an accumulator charging valve 34,
an accumulator discharge valve 36,
two motor valves 15 and 17, associated respectively with the motors 16 and 18.

The pump valve 32 is a four-way, three-position valve. It exhibits:
a first upstream port A which is connected with a delivery port 200 of the pump 20 through a pipe 38;
a second upstream port B which is connected to an unpressurized reservoir 40 by a pipe 42 (the reservoir 40 can be the same as the reservoir 31);
a first downstream port C which is connected to a first port A of the valve 15 by a pipe 44;
a second downstream port D which is connected to a pipe 46 (described later) at a junction point T1.

The valve 32 has a first position I wherein the first upstream port A is connected to the first downstream port C, and the second upstream port B is connected to the second downstream port D; a second position II wherein the first upstream port A is connected to the second upstream port B, and the first and the second downstream ports C and D are isolated; and a third position III wherein the first upstream port A is connected to the second downstream port D, and the second upstream port B is connected to the first downstream port C.

Valve 32 is a solenoid valve, the slide whereof can be controlled in the first and third positions by two solenoids 48, 50 and which is returned to the second position by two opposing return springs 52, 54.

A non-return valve 56 is interposed on the pipe 44 and allows fluid to flow only toward the valve 15.

A pressure limiter 58 is arranged between the pipe 38 and the pipe 42, in order to prevent excessive pressure rise in the pipe 38.

This limiter 58 is calibrated to a relatively high value called the first threshold setting. This first pressure setting threshold is the maximum pressure that can be tolerated by the different hydraulic components likely to be exposed to this pressure, to with the pump 20 and the motors 16 and 18.

The selection of a high first threshold setting allows the pump 20 to supply fluid under this elevated pressure to the motors 16 and 18, which allows a relatively high power to be transmitted to them.

The accumulator charging valve 34 is a four-way, two-position valve. It exhibits:
a first upstream port A which is connected to a port D, called the fourth port, of the valve 17, by a pipe 60;
a second upstream port B which is connected to the pipe 44 at a junction point T2 by a pipe 62;
a first downstream port C which is connected to the accumulator by a pipe 64;
a second downstream port D which is connected by the pipe 46 mentioned earlier to the reservoir 40.

A non-return valve 66 is interposed on the pipe 62 and allows fluid to flow only toward the pipe 44.

The junction point T2 between the pipe 62 and the pipe 44 is located between the port A of the valve 15 and the checkvalve 56.

A non-return valve 68 is interposed on the pipe 64 and allows fluid to flow only toward the accumulator 22.

A calibrated non-return valve 69 is interposed on the pipe 46 and allows fluid to flow only toward the reservoir 40. The setting of the valve 69 is set to a threshold (second threshold setting) which equals from 3 to 5 bars.

The charging valve 34 has two positions. In the first position I, the first upstream port A is connected to the first downstream port C and the second upstream port B is connected to the second downstream port D; and in the second position, the first upstream port A is connected to the second downstream port D and the second upstream port B is connected to the first downstream port C. The valve 34 is a solenoid valve controlled by a solenoid 70. It is returned by default to its second position II by return arrangements 72.

The valves 15 and 17 are identical valves. Thus, only the valve 15 will be described in detail.

The valve 15 is a four-way, three-position valve. It exhibits:

a first port A, which is connected as indicated to the port C of the valve 32 by the pipe 44;

a second port B which is connected to a feed port of the motor 16;

a third port C which is connected to an exhaust port of the motor 16;

a fourth port D which is connected to the first port A of the valve 17 by a pipe 74.

The motor valve 15 has three positions. in the first position I, the first port A is connected to the second port B, and the third port C is connected to the fourth port D: the valve 15 allows the fluid in the motor 16 to be made to pass between the end of the pipe 44 (on the side toward the valve 15) and the pipe 74, in a first direction feeding the motor 16. In the second position II, the four ports of the valve 15 are connected: the valve 15 then constitutes a bypass of the motor 16. In the third position III (which is optional), the first port A is connected to the third port C, and the second port B is connected to the fourth port D: the valve 15 then interposes the motor 16 between the end of the pipe 44 (on the side toward the valve 15) and the pipe 74, in a second feed direction that is the reverse of the first. The valve 15 is a solenoid valve controlled by two solenoids 76 and 76'. It includes return arrangements 78 and 78' which place it by default in the second position II (position bypassing the motor 16).

As regards the valve 17, its second and third ports B and C are connected respectively to the feed and exhaust ports of the motor 18. Its port A is connected to the pipe 74. Its port D is connected, as stated above, to the port A of the discharge valve 34.

It is therefore understood that the valves 15 and 17 allow either of the motors 16 and 18 to be freely interposed between the aforementioned end of the pipe 44 and the pipe 60, or even both motors in series. The pipe 74 therefore corresponds to the "series line" presented earlier.

The accumulator discharge valve 36 is a two-way valve with two positions. It exhibits:

an upstream port A connected to the pipe 64 at a junction point T4;

a downstream port B connected to the pipe 44 at a junction point T3 by a pipe 80.

in the first position I, the valve 36 isolates ports A and B; conversely it connects them in the second position II.

The junction point T3 is located between the junction T2 and the port A of the valve 15.

A non-return valve 82 is interposed on the pipe 80 and allows fluid to flow only toward the pipe 44.

The junction point T4 is located between the accumulator 22 and the non-return valve 68.

The valve 36 is a solenoid valve controlled by a solenoid 84. It includes return arrangements 86 which place it by default in the first position.

A pressure sensor P1 is connected to the pipe 64 at the junction point T4, via a pipe 88. It provides information on pressure in the accumulator 22 to the control unit 11.

Finally a pressure limiter 90 and a manual drain valve 92 are connected to the pipe 88: the pressure limiter 90 allows fluid to be drained from the accumulator 22 (via pipes 64 and 88) to a reservoir 94, if the pressure becomes excessive in the accumulator 22. The valve 92 allows the accumulator to be flushed when needed.

The operation of the system 10 will now be described. This operation is controlled by the electronic control unit 11. Indeed, the different solenoid valves 15, 17, 32, 34, 36 of the device 10 are controlled by the control unit 11, and the pressure sensor P1 is connected to the control unit 11.

The control unit can place the system in any one of the following operating modes:

an isolation mode wherein the motors are not driven and the fluid delivered by the pump 20 is directed toward the reservoir 40;

three drive modes, wherein the motors are driven:

a first accumulator-driven mode, wherein only the accumulator provides the fluid feeding the motors;

a second drive mode, by the accumulator and the pump, wherein the accumulator and the pump supply the fluid feeding the motors;

a pump-driven mode, wherein only the pump supplies the fluid feeding the motors;

an energy-recovery mode, wherein the motors are braked, the fluid pumped by the motors is directed to the accumulator.

In the different modes presented above, although reference is made to "the motors," these modes can also be implemented when a single motor is used, thanks to the valves 15 and 17 which allow one and/or the other of the motors 16 and 18 to be freely connected to the pipe 74.

The positions of the valves corresponding to the different operating modes of the device 10 are the following:

|  | Valves | | |
| --- | --- | --- | --- |
| Operating mode | 32 | 34 | 36 |
| Isolation | II | any | I |
| First accumulator-driven mode (accumulator only) | II | II | II |
| Second accumulator-driven mode (accumulator and pump) | I | II | II |
| Pump-driven mode (pump only) | I | II | I |
| Energy recovery | III | I | I |

What is more, in the accumulator-driven acceleration or energy recovery modes, it is possible to make the fluid pass through one and/or the other of the motors 16 and 18, in conformity with the following control table:

|  | Valves | |
| --- | --- | --- |
| Type of motor feed | 15 | 17 |
| No feed | II | II |
| Motor 16 fed | I | II |
| Motor 18 fed | II | I |

-continued

| Type of motor feed | Valves | |
|---|---|---|
| | 15 | 17 |
| Motors 16 and 18 fed | I | I |
| Motor 16 fed in reverse | III | II |
| Motor 18 fed in reverse | II | III |
| Motors 16 and 18 fed in reverse | III | III |

The operation of the device 10 is the following:

When the masses are at rest, the pump valve is placed in position II. The fluid delivered by the pump is then directed toward the reservoir 40. Further, the accumulator discharge valve 36 is placed in position I so as to isolate the accumulator 22.

To drive the masses 12 and 14 into rotation, when they are stopped, the accumulator-driven mode is given priority for use. If the accumulator pressure is sufficient, the device is first placed in the first accumulator-driven mode, wherein only the accumulator 22 supplies the fluid feeding the motors. The accumulator discharge valve 36 is opened (position II), so that the pressurized fluid contained in the accumulator passes through the motors 16 and 18. The motors are thus driven, and drive in rotation the masses 12 and 14.

If the pressure in the accumulator, without being zero (i.e. atmospheric pressure), is nevertheless insufficient for effectively driving the motors, it is possible to opt for the second accumulator-driven mode, that is with the pump. The fluid delivered by the pump 20 is then added to the fluid leaving the accumulator 20 to feed the motors, which allows a higher motor feed pressure to be maintained for a longer period than if only the accumulator were feeding the motors (first accumulator-driven mode).

The accumulator-driven modes, however, can be used only if the pressure in the accumulator 22 is greater than a given predetermined value, customarily representing an empty or nearly empty state of the accumulator. When the pressure in the accumulator falls below this value, it is necessary, to drive the masses 12 and 14, to use the pump. The device is then placed in pump-driven mode. In this mode of operation, the pump valve 32 is placed in the first position I. The fluid delivered by the pump is sent directly to the motors 16 and 18 via the pipe 44. As the charging valve 34 is in position II, the fluid leaving the motor 18 is directed by the pipe 46 to the reservoir 40. The accumulator 22, in this mode of operation, remains isolated.

Conversely, for braking the masses 12 and 14, the device is placed in energy-recovery mode. For that purpose, the control unit 11 causes the accumulator charging valve 34 to move into position I, while the discharge valve 36 remains closed (in position I) and the pump valve 32 moves into position III. In this configuration, the fluid delivered by the pump 20 leaves the valve 32 by the port D and joins the pipe 46 at point T1; it is thus directed either toward the valve 34 or toward the reservoir 40. Due to the calibrated valve 69 on the pipe 46, the pressure in the pipe 46 does not exceed the second pressure threshold, equal to the pressure setting of the valve 69, to with a few Bars.

Consequently, the pressure in the pipe 46 is held to the pressure setting of the valve 69, particularly due to the constant delivery of fluid by the pump 20. This situation therefore advantageously allows the motors 16 and 18 to be fed "on demand" with fluid under low pressure. The motors 16 and 18 can thus be fed continuously at the lowest possible pressure that avoids any risk of cavitation. The braking torque of the motors 16 and 18 is thus maximized without risk to the motors.

The pressure setting of the valve 69 is naturally much lower than that of the pressure limiter 58. Indeed, while the pressure setting of the valve 69 is selected to be the minimum possible value for avoiding any risk of cavitation, in order to maximize the differences in pressure between the ports of the motors 16 and 18 (to allow maximum braking), then on the contrary the pressure setting of the limiter 58 is chosen rather high, as indicated previously, to allow a high power delivery by the pump 20 to the motors 16 and 18, in the form of hydraulic pressure. Thanks to these advantageous arrangements, a single pump (pump 20) makes it possible on the one hand to drive the motor(s) (16, 18) at a relatively high pressure limited only by the first pressure threshold; and on the other hand to feed the motor(s) at a much lower pressure in energy-recovery mode, set by the second pressure threshold, the first threshold being relatively high compared with the second.

Figure 2:
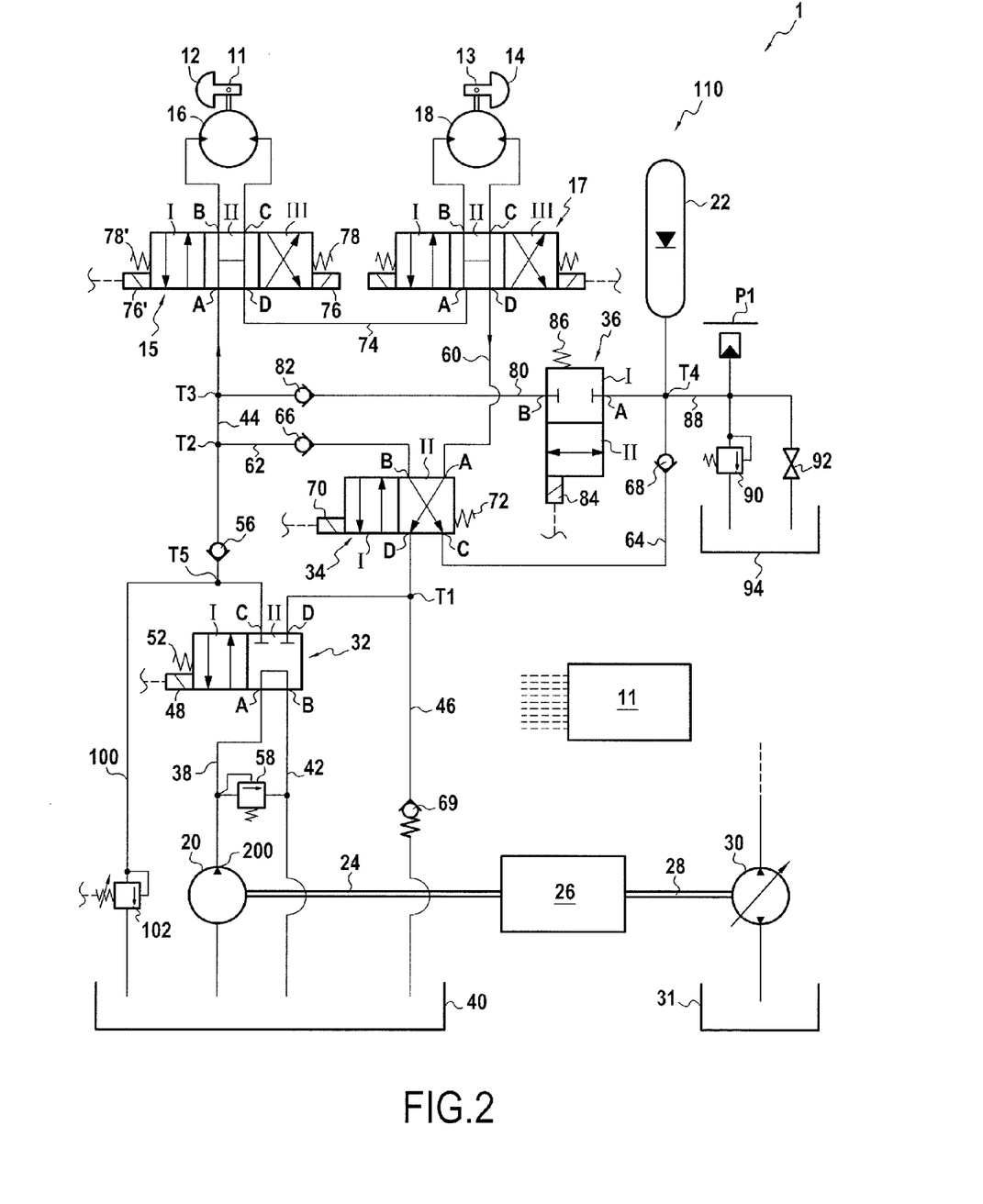
FIG. 2 is a second embodiment of the invention.

FIG. 2 shows a device 110 according to the invention, which is a variation of the device 10.

In the device 100, the valve 32 is modified and has only its first and second positions (I and II).

A fluid return pipe 100 is added to connect the port C of the valve 32 to the reservoir 40. This pipe connects the pipe 44, at a junction point T5 located between the port C of the valve 32 and the checkvalve 56, to the reservoir 40. On the pipe 100 is arranged a controlled pressure limiter 102, the pressure whereof can be controlled by the control unit 11.

The positions of the charging, accumulator discharge and pump valves, the positions of the valve 102, corresponding to the different operating modes of the device 110, are the following:

| Operating mode | Valves-limiter | | | |
|---|---|---|---|---|
| | 32 | 34 | 36 | 102 |
| Isolation | II | any | I | Closed |
| First accumulator-driven mode (accumulator only) | II | II | II | Closed |
| Second accumulator-driven mode (accumulator and pump) | I | II | II | Closed |
| Pump-driven acceleration (pump only) | I | II | I | Closed |
| Energy recovery | I | I | I | Regulating |

The operation of the device 110 in isolation mode, and in the different drive modes, is substantially the same as that of the device 10 in the same modes. In these modes, in fact, the pump valve is not placed in its third position. In these modes, the limiter 102 remains closed; consequently, no fluid circulates in the pipe 100.

However, the operation in energy-recovery mode is different. The pump valve is placed in position I, which allows the delivered fluid to be routed directly into the pipe 44, without passing through the valve 34 as in the device 10. The pressure in the pipe 44 is limited by the pressure limiter 102. The pressure setting of the limiter 102 is controlled by the control unit 11, which in turn is controlled by the operator of the compactor. The feed pressure of the motors 16 and 18 is established at the pressure setting of the limiter 102. The feed pressure of the motors 16 and 18 is higher or lower, depending on the value that is assigned to it. As the braking torque is directly connected with the pressure difference between the feed and exhaust pressures of the motors 16 and 18, the intensity of the braking torque of the motors 16 and 18 is directly affected. Control of the pressure setting of the limiter 102 therefore advantageously allows control of the intensity of the braking torque of the motors 16 and 18.

It will be noted that in the device 10, the calibrated valve 69 can be replaced by a pressure limiter with a controllable pressure setting identical to the limiter 102, in order to obtain the same capability as in the device 110, to with the possibility of controlling the braking intensity in energy-recovery mode.

Figure 3:
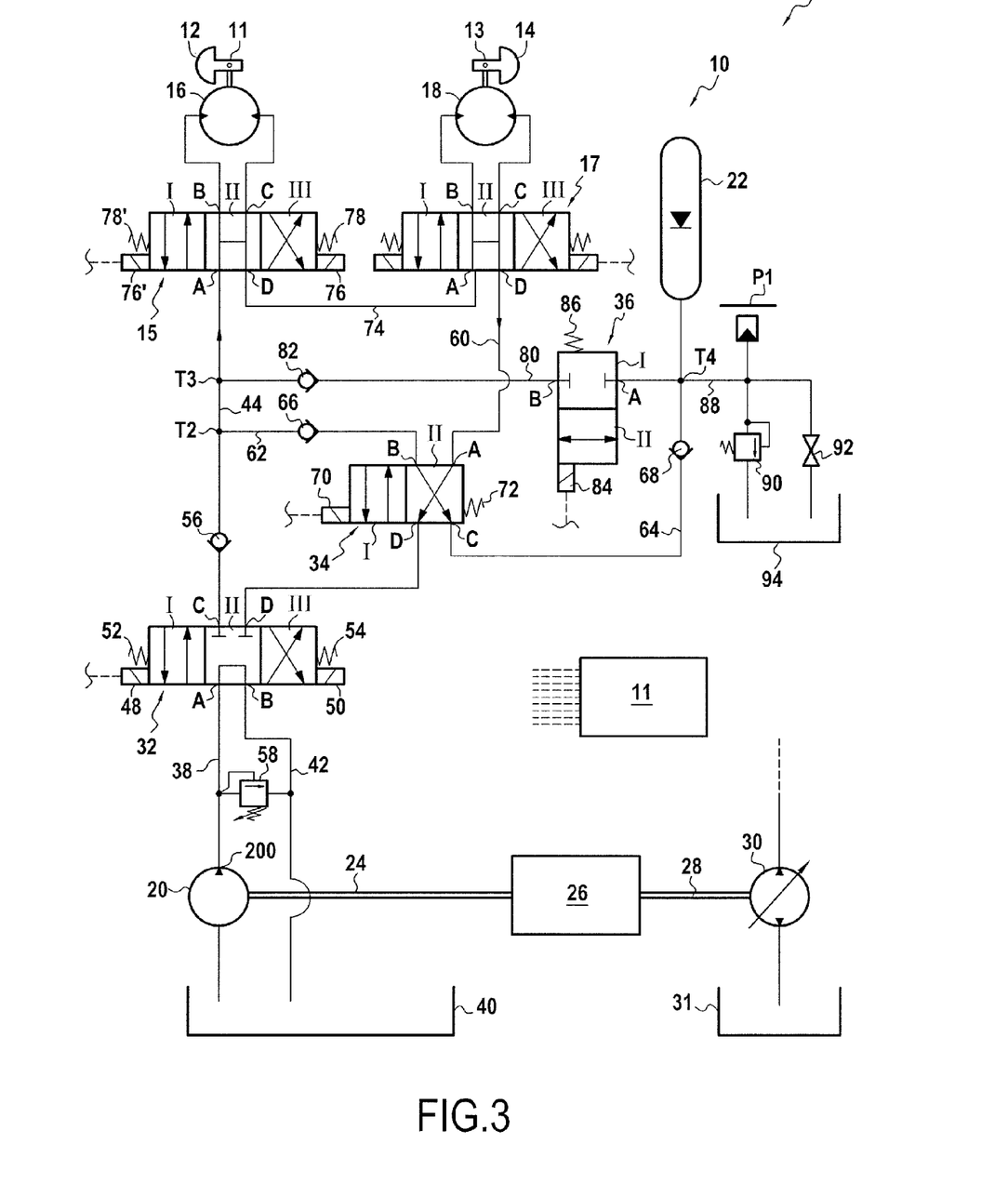
FIG. 3 is a third embodiment of the invention.

FIG. 3 presents, with an hydraulic transmission device 210, a third embodiment of the invention.

This one differs from the device 10 only by the following points:

the section of the pipe 46 located downstream of the junction T1, as well as the calibrated valve 69, are eliminated; and the pressure limiter 58 has a variable pressure setting and not a fixed setting as before.

Thanks to these arrangements, the same operating modes as the device 10 can be obtained.

More precisely:

in energy-recovery mode (position III) of the valve 32, the limitation of the pressure to a low value is limited below a value called the second threshold by imposing on the limiter 58, in this operating mode, the desired value for the second threshold; and in the pump-driven modes or those with accumulator and pump, the pressure in the pump delivery and motor feed pipe (pipes 38 and 44) can be limited to a suitable value while being limited only to a first threshold of relatively high value, by imposing this first threshold in these operating modes through the pressure setting of the limiter 58.

The invention claimed is:

1. An hydraulic transmission device, comprising:
at least one hydraulic rotary motor;
the at least one hydraulic rotary motor exchanging fluid via two main ports, namely one feed port and one exhaust port;
a hydraulic pump;
a fluid accumulator, capable of storing and delivering fluid under pressure;
the device being capable of operating:
in a pump-driven mode, in which the pump supplies fluid under pressure to the at least one hydraulic rotary motor via the feed port to drive the at least one hydraulic rotary motor in rotation, the fluid being drawn from an unpressurized reservoir;
in an accumulator-driven mode, in which fluid under pressure is delivered by the accumulator at the feed port to drive the at least one hydraulic rotary motor in rotation;
in an energy-recovery mode, in which the pump supplies fluid to the at least one hydraulic rotary motor via the feed port, the fluid being drawn from the unpressurized reservoir; and the at least one hydraulic rotary motor acting as a pump pumps fluid into the accumulator via the exhaust port;
the device further comprising an accumulator charging valve, made with a first upstream port connected to the exhaust port and a first downstream port connected to the accumulator, and having a first (I) and a second (II) positions, which makes it possible to connect the exhaust port to the accumulator or to isolate the exhaust port from the accumulator while the feed port is connected to a delivery port of the pump.

2. A device according to claim 1, wherein, in a pump-driven mode called the pump-only drive mode, at least one hydraulic rotary motor is fed only by the pump, and receives no fluid from the accumulator.

3. A device according to claim 1, so arranged that, in pump-driven mode:
the delivery port is connected to the feed port and further the exhaust port is connected to the unpressurized reservoir.

4. A device according to claim 1, the device having a specific pump-driven mode called "pump- and accumulator-driven mode," wherein the accumulator feeds at least hydraulic rotary motor, supplementing the feed provided by the pump.

5. A device according to claim 4, wherein, in the pump- and accumulator-driven mode:
the delivery port and the accumulator are connected to the feed port; and
the exhaust port is connected to the unpressurized reservoir.

6. A device according to claim 1, additionally including pressure-limiting equipment which:
in pump-driven mode, limits the pressure of the fluid delivered by the pump to a first threshold; and
in energy-recovery mode, limits the pressure of fluid delivered by the pump to a second threshold lower than the first threshold.

7. A device according to claim 6, wherein the pressure-limiting equipment comprises:
either a pressure limiter with a variable setting, said first and second thresholds corresponding to different settings of said limiter,
or two pressure limiters, the calibration values of which correspond respectively to said first and second thresholds.

8. A device according to claim 1, wherein said accumulator charging valve is a four-way valve, having in addition a second upstream port which is connected to the feed port and a second downstream port which the device allows to be connected to the delivery port or to the unpressurized reservoir; in the first position of the charging valve, the first upstream port is connected to the first downstream port and the second upstream port is connected to the second downstream port; and in the second position of the charging valve, the first upstream port is connected to the second downstream port and the second upstream port is connected to the first downstream port.

9. A device according to claim 8, further comprising a charging valve upstream check-valve, interposed between the second upstream port of the charging valve and the feed port, which charging valve upstream check-valve lets fluid flow only from the charging valve towards the feed port.

10. A device according to claim 1, further comprising an accumulator discharge valve, made with an upstream port, which is connected to the accumulator and a downstream port which the device allows to be connected to the feed port, and having a first (I) and a second (II) positions, wherein it allows its two ports to be isolated or connected, respectively.

11. A device according to claim 10, further comprising an accumulator discharge valve check-valve, interposed between the downstream port of the accumulator discharge valve and the feed port, which accumulator discharge valve check-valve lets fluid flow only from the accumulator discharge valve towards the feed port.

12. A device according to claim 1, further comprising a four-way pump valve, having:
a first upstream port connected to the delivery port;

a second upstream port connected to the unpressurized reservoir;

a first downstream port which is connected to the feed port;

a second downstream port which the device allows to be connected to the exhaust port;

a first position (I) wherein the first upstream port is connected to the first downstream port, and the second upstream port is connected to the second downstream port;

a second position (II), wherein the first upstream port is connected to the second upstream port and the first and the second downstream ports are isolated.

13. A device according to claim 12, wherein the pump valve has in addition a third position (III), wherein the first upstream port is connected to the second downstream port and the second upstream port is connected to the first downstream port.

14. A device according to claim 13, further comprising the accumulator charging valve, made with the first upstream port connected to the exhaust port and the first downstream port connected to the accumulator, and having the first (I) and the second (II) positions, wherein it provides respectively for connecting the exhaust port to the accumulator and for isolating the exhaust port from the accumulator;

an accumulator discharge valve, made with an upstream port, which is connected to the accumulator and a downstream port which the device allows to be connected to the feed port, and having a first (I) and a second (II) positions, wherein it allows its two ports to be isolated or connected, respectively; and a control unit arranged so as to, in energy-recovery mode, place the pump valve in the third position (III) and the discharge valve in the first position (I);

wherein the second downstream port of the pump valve is connected to the second downstream port of the charging valve.

15. A device according to claim 12, further comprising a four-way pump valve check-valve, interposed between the first downstream port of the four-way pump valve and the feed port, which four-way pump valve check-valve lets fluid flow only from the four-way pump valve towards the feed port.

16. A device according to claim 1, wherein the at least one hydraulic rotary motor is at least two motors, as well as circuit arrangements capable of causing fluid to pass or not through said at least two motors, such that, in one configuration of the device, in accumulator-driven mode, the fluid under pressure drives in rotation at least a second motor in addition to a first motor; and in energy-recovery mode, said first and second motors are fed and the fluid leaving said first and second motors is injected into the accumulator.

17. A device according to claim 1, further comprising a control unit, arranged so as to, when the at least one hydraulic rotary motor is to be driven in rotation, if the pressure in the accumulator is greater than a predetermined threshold, place the device in accumulator-driven mode.

18. An assembly comprising a device according to claim 1, a shaft, and a mass mounted eccentrically on the shaft and capable of being driven in rotation around the shaft so as to cause it to vibrate, the at least one hydraulic rotary motor being coupled to said mass.

* * * * *